Dec. 8, 1970 V. A. PHELPS ET AL 3,545,321
CLOSE TOLERANCE GASKET MAKING
Original Filed March 25, 1959 5 Sheets-Sheet 1

INVENTOR.
VERNON A. PHELPS
MERWIN F. READ
FREDERICK E. READ
BY Barnes, Kisselle, Raisch & Choate
ATTORNEYS

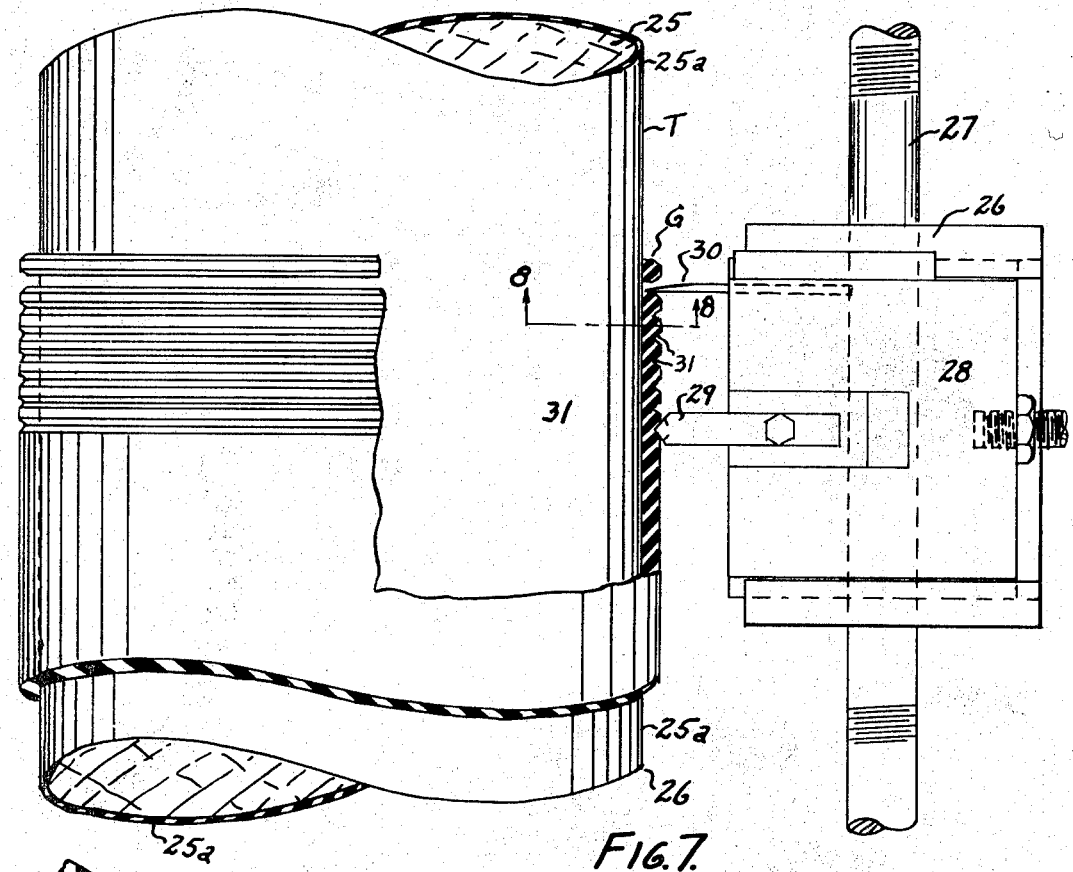
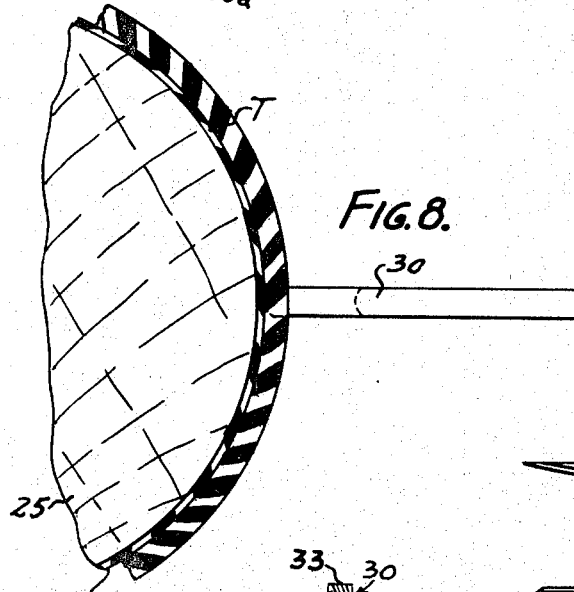
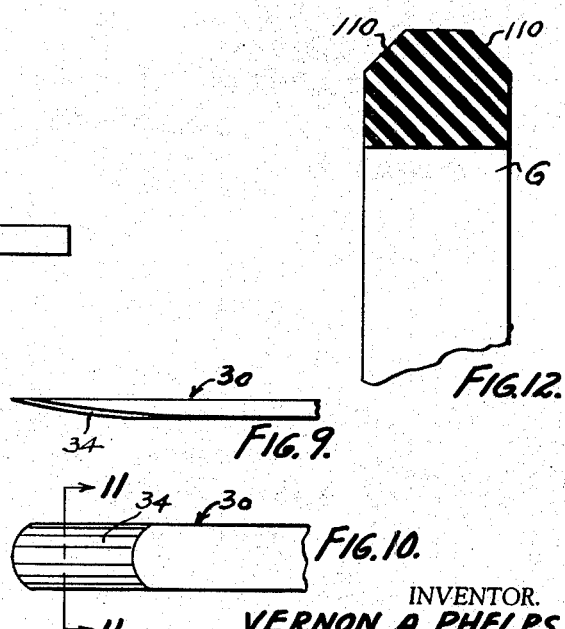
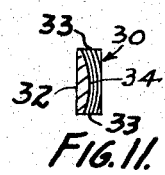
INVENTOR.
VERNON A. PHELPS
MERWIN F. READ
FREDERICK E. READ
BY Barnes, Gisselle, Raisch & Choate
ATTORNEYS

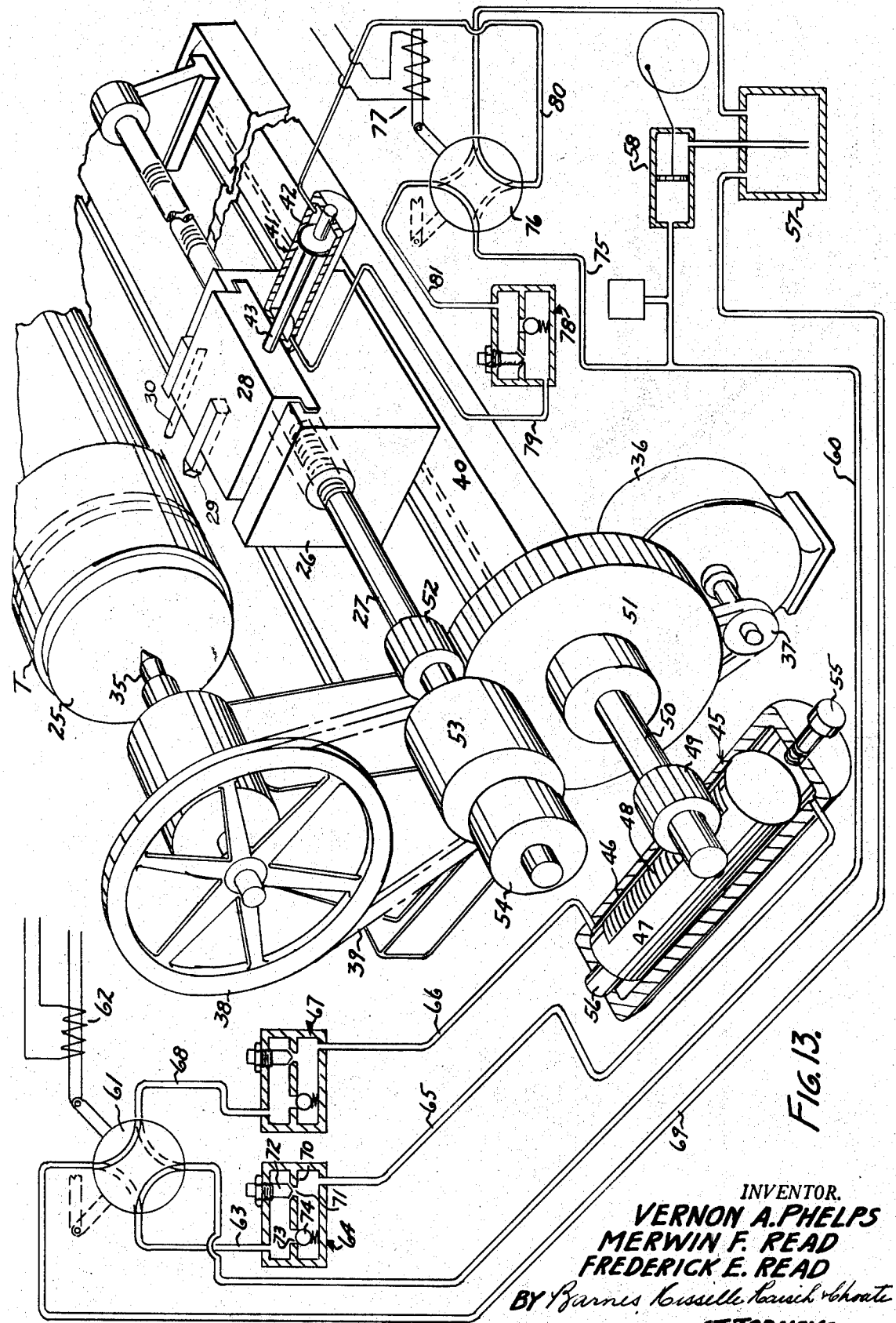

INVENTOR.
VERNON A. PHELPS
MERWIN F. READ
FREDERICK E. READ
BY Barnes, Kisselle, Raisch & Choate
ATTORNEYS INVENTOR.
VERNON A. PHELPS
MERWIN F. READ
FREDERICK E. READ
BY Barnes, Kisselle, Raisch & Choate
ATTORNEYS United States Patent Office 3,545,321
Patented Dec. 8, 1970

3,545,321
CLOSE TOLERANCE GASKET MAKING
Vernon A. Phelps, 1006 Avon, Ann Arbor, Mich. 48104; Merwin F. Read, Half Moon Lake, Pinckney, Mich. 48169; and Frederick E. Read, 23615 Filmore, St., Taylor Township, Wayne County, Mich. 48180
Original application Mar. 25, 1959, Ser. No. 801,918. Divided and this application May 13, 1963, Ser. No. 279,939
Int. Cl. B23b 1/00
U.S. Cl. 82—47                                       7 Claims

ABSTRACT OF THE DISCLOSURE

Making square cut gaskets from a tube of soft rubber having a hardness of less than 80 durometer on the A scale wherein the tube is first subjected to a turning operation utilizing a diamond cutting tool and thereafter severed into a plurality of gaskets.

---

This application is a division of our prior application, Ser. No. 801,918, filed Mar. 25, 1959, now abandoned.

This invention relates to close tolerance gasket making and particularly to making gaskets from a tube of soft rubber having a hardness of less than 80 durometer on the A scale.

In the making of gaskets for use in static and dynamic pressure seals from a tube, it is customary to form the tube by extruding the rubber composition. As a result of the extrusion, the periphery of the tube which is formed does not have the required diameter and smoothness. Accordingly, the present practice is to mount the tube on a mandrel and bring a grinding wheel into contact with the periphery of the tube in an effort to provide a smooth surface of predetermined diameter. Because of the excessive heat that is created, it has been found advisable to utilize a coolant such as water, air and the like. However, even with the use of the coolant, the process is slow requiring a great deal of time and resulting in a high cost. In addition, since the grinding tends to dig in and distort the rubber, the degree of accuracy achieved is not as good as would be required. Such a prior art method of providing a surface of predetermined accuracy is shown in the prior patent to Bussing 2,016,590.

The tolerances available by such a method are limited to about 0.008 inch and by close inspection selected gaskets occasionally may be found within closer tolerances.

In an effort to obtain greater accuracy, various attempts have been made to utilize a cutting tool which is brought into contact with the periphery of the rotating tube. However, because of the high abrasive action between the metal cutting tool and the rubber, the life of the tools is extremely short and this method has proved completely uneconomical. Tools made of high speed steel and tungsten carbide have proved unsuccessful.

Even though it is not possible in mass production to accurately form the periphery of the tube of soft rubber by using high speed steel and tungsten carbide cutting or turning tools, we have discovered that cutting tools made of a material which has a high resistance to abrasion, a low coefficient of friction, and is a good conductor of heat, preferably diamond tip cutting tools, produce an accurately formed surface on tubes of soft rubber.

In cutting gaskets from a tube, it has been the practice to utilize rotating cutters. Although such cutters operate satisfactorily from the standpoint of maintenance and general operation, it is impossible to obtain close tolerances by utilizing such cutters. In general, it is only possible to obtain tolerances within plus or minus 0.008 inch and, of course, by close inspection selected gaskets might be chosen which are within closer tolerances.

We have discovered that gaskets of close tolerances may be obtained from a tube of soft rubber by utilizing a stationary cutting or severing tool which is brought radially into contact with the tube to sever the gaskets.

It is therefore an object of this invention to provide a novel method and apparatus for first forming a surface of predetermined diameter and smoothness on a tube of soft rubber and thereafter cutting the tube into gaskets, the resulting gaskets being within an overall tolerance not heretofore obtained for this type of gasket.

It is a further object of the invention to provide novel forming and cutting tools to be used in forming such gaskets without the use of lubricants.

In the application of gaskets which are cut from a tube, commonly called square cut gaskets, a limiting factor has been the inability to use such gaskets in situations where one part must move relative to the other either during assembly or in operation. The relative motion between one part and another causes a distortion and tearing of the usual square cut gasket. As a result, it has become necessary in such applications to use O-ring gaskets which are molded and which are inherently more expensive.

In addition to the cost an inherent disadvantage of O-ring type gaskets is that there is a tendency of the gaskets to roll or spiral when they are used in a dynamic application and as a result the O-rings begin to fail.

It is therefore a further object of this invention to provide a novel construction of square cut gaskets to provide a static or a dynamic seal in applications where one part is movable relative to one another, either during assembly or in operation.

It is a further object of this invention to provide a square cut gasket interposed between the parts to provide a pressure seal and wherein it is possible to govern the resistance to movement of one part relative to another.

In the drawings:

FIG. 7 is a fragmentary part sectional plan view of the apparatus for cutting the gaskets from a tube of soft rubber.

FIG. 8 is a fragmentary vertical section of the apparatus shown in FIG. 7 taken along the line 8—8 in FIG. 7.

FIG. 9 is a plan view of a cutting tool.

FIG. 10 is a side elevation of the cutting tool.

FIG. 11 is a sectional view of the cutting tool taken along the line 11—11 in FIG. 10.

FIG. 12 is a fragmentary sectional view through a gasket made in accordance with the apparatus shown in FIGS. 7 and 8.

FIG. 13 is a fragmentary part sectional partly diagrammatic perspective view of the apparatus for cutting the gaskets from a tube of soft rubber, showing the hydraulic circuit.

Figure 1:
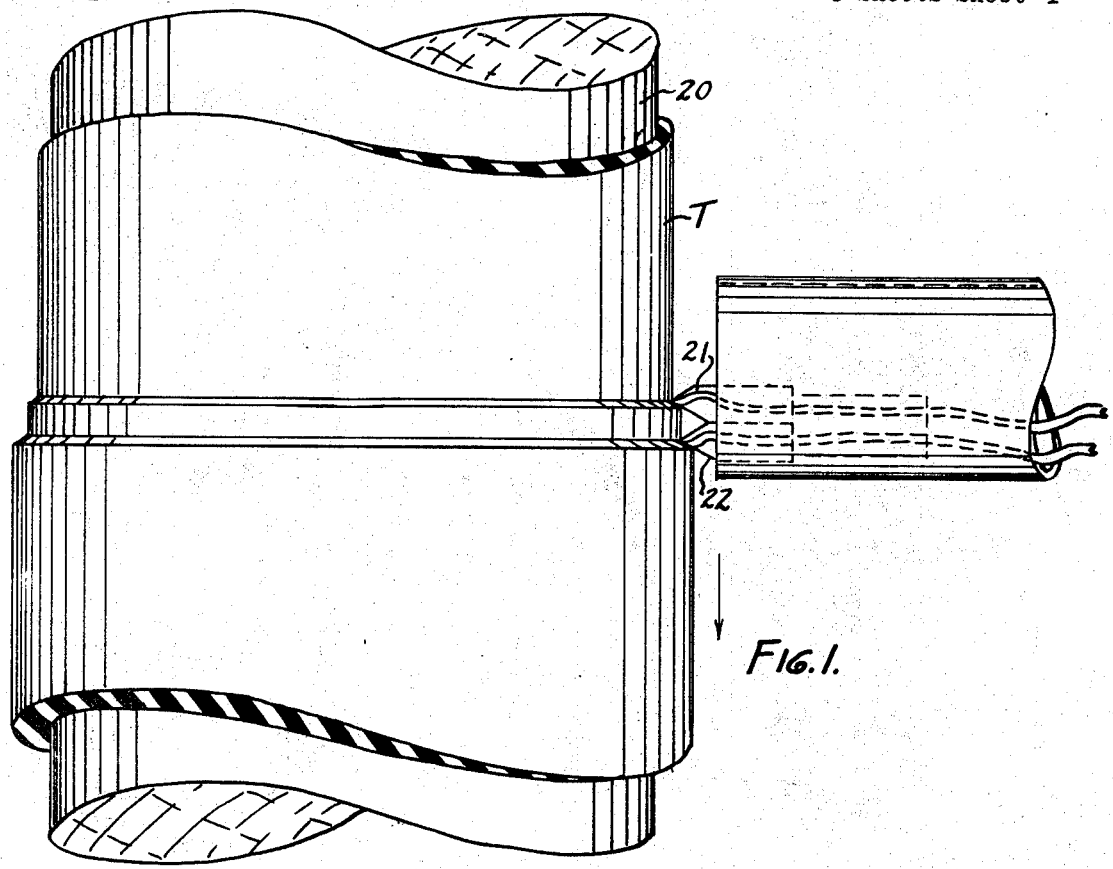
FIG. 1 is a fragmentary plan view showing the formation of the desired surface on a tube of soft rubber.
Figure 3:
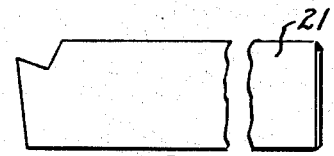
FIG. 3 is a side elevation of the forming tool used in the apparatus shown in FIGS. 1 and 2.
Figure 4:
FIG. 4 is a side elevation of the forming tool from the opposite side.
Figure 5:
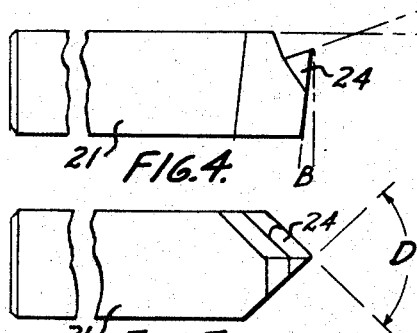
FIG. 5 is a plan view of the forming tool.
Figure 6:
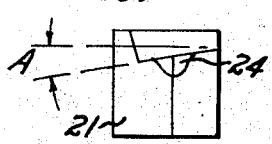
FIG. 6 is a front elevation of the forming tool.
Figure 2:
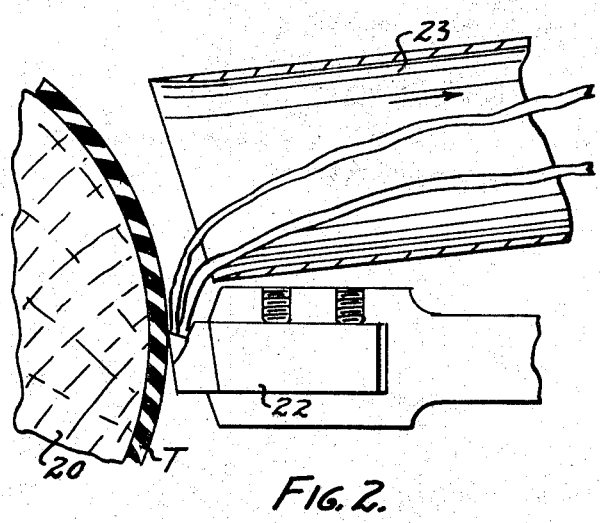
FIG. 2 is a fragmentary vertical section of the apparatus shown in FIG. 1.

The apparatus for forming the predetermined surface on a tube of soft rubber is shown in FIGS. 1 and 2 and comprises a cylindrical mandrel 20 which is preferably made of a light weight material such as wood, plastic or aluminum onto which the rubber tube T is mounted in snug relationship, that is, the outer diameter of the mandrel 20 is substantially equal to the inner diameter of the tube T. The tube T has been previously formed in the usual manner by extrusion and the outer surface thereof must be further treated or formed in order to provide a smooth surface of predetermined diameter. The rubber comprising tube T has a hardness of less than 80 durometer on the A scale.

According to the invention, the mandrel 20 is mounted between centers on a lathe and rotated at high speeds. In one or more cutting tools made of a material having a high resistance to abrasion, low coefficient of friction and high heat conductivity, preferably diamond tipped cutting tools, are brought into contact with the periphery of the tube and moved longitudinally thereto to cut into and remove a portion of the rubber from the surface of the tube.

As shown in FIGS. 1 and 2, diamond tools 21, 22 are brought into contact with the periphery of the tube T, the trailing tool 21 projecting radially inwardly a greater distance than the leading tool 22. As the mandrel 20 is rotated, the tools 21, 22 are moved in a direction parallel to the axis of the mandrel 20 as indicated by the arrow.

The rubber that is removed by the cutting tools is preferably carried away through a tube 23 which is connected to a source of vacuum so that a suction is created drawing away the rubber which has been removed.

The tools 21, 22 are preferably brought into contact with the periphery of the tube T at a point above a horizontal center line (FIG. 2).

By utilizing two tools 21, 22, it is possible to obtain a first rough cut with tool 22 and a second finishing cut with tool 21.

The use of the tools having the desired properties such as diamond tools permits the mandrel 20 to be rotated at a relatively high speed. The tools can be moved longitudinally of the mandrel 20 at a relatively high speed. For example, it is possible to turn the surface of a tube which is 36 inches long and nine inches in diameter in approximately 12 minutes. This may be contrasted to forming a surface of less accuracy on such a tube by grinding which requires one hour and 32 minutes.

Although the speeds of rotation of mandrel 20 may vary over wide ranges, satisfactory results may be obtained by utilizing a cutting speed of 1000 to 15000 feet per minute for rubber of 60–80 durometer on the A scale and 1500 to 2000 feet per minute for rubber of under 60 durometer on the A scale.

Cutting tools 21, 22 are of identical construction and are more specifically shown in FIGS. 3 to 6. As shown in these figures, a diamond tip 24 is provided on the end of the tool and is formed with a point. The tool includes a side rake angle A, back rake angle C, front relief angle B and cutting angle D. The degree of these various angles varies with the durometer of the soft rubber as follows:

|  | Durometer, deg. | |
| --- | --- | --- |
|  | 60–80 | 30–60 |
| Side rake angle A | 4–9 | 9–15 |
| Back rake angle C | 4–9 | 9–15 |
| Front relief angle B | 6–9 | 7–15 |
| Cutting angle D | 85 | 85 |

After the tube has been formed by the apparatus shown in FIGS. 1 and 2, it is then transferred to a lathe apparatus shown in FIGS. 7 and 8 which includes a mandrel 25 having a rubber sleeve or coating 25a thereon onto which the tube T is slipped, the tube being in snug relationship to the mandrel.

The mandrel 25 is mounted between centers of a lathe as presently described and rotated about its axis. A carriage 26 is mounted on the lathe adjacent the mandrel for movement on a screw 27 and the screw 27 is rotated periodically to successively index the carriage 26. A slide 28 is mounted on the carriage 26 for reciprocating movement radially inwardly and outwardly relative to the mandrel 25. A chamfering tool 29 and a cutting tool 30 are mounted on the slide 28 so that when the slide 28 is moved radially inwardly the chamfering tool contacts the periphery of the tube T and forms annular grooves or chamfers 31 in the periphery of the tube T. Simultaneously, the cutting tool 30 cuts into the tube T at the base of a previously formed groove 31 to sever a gasket G from the tube. As the carriage 26 is successively indexed and the slide 28 is moved inwardly and outwardly simultaneous chamfering of tube T and cutting of gaskets G from tube T is achieved.

It should, of course, be understood that where the chamfering is not desired it may be eliminated and the cutting tool may be brought into contact with the periphery to sever from the tube a gasket which is rectangular in cross section.

The cutting tool 30 is preferably made of a high grade tool steel and has the configuration shown in FIGS. 9–11. As shown in these figures, the cross section of the cutting tool 30 is rectangular and the end is tapered and includes a flat side 32, flat edges 33, and a tapered convex side 34 terminating in a curved tip 30 which is semicircular and has a diameter equal to the distance between edges 33.

The tool is preferably brought into contact with the rubber tube by movement along a radial line with the lower edge 33 lying along this line.

Referring to FIG. 13 which shows the apparatus for cutting the gaskets for the tube, as shown, the mandrel 25 supporting the tube T, which have been previously formed in accordance with the apparatus shown in FIGS. 1 and 2, is supported between centers 35 of a lathe, one of which is shown. Center 35 is driven by a motor 36 through pulleys 37, 38 and endless belt 39 trained over the pulleys. The carriage 26 is supported on the bed 40 of the lathe for movement longitudinally of the mandrel 25 and the threaded shaft 27 is rotatably mounted on the lathe and is threaded through the carriage 26. The slide 28 is reciprocated on carriage 26 by a hydraulic piston motor 41 which includes a cylinder 42 fixed on the carriage 26 and piston 43 which is connected to the slide 28. When hydraulic fluid is applied to opposite ends of the cylinder 42, the piston 43 is reciprocated to move the slide 28 radially inwardly and outwardly relative to the mandrel 25.

The screw shaft 27 is rotated to index the carriage 26 by operation of a hydraulic motor 45 which comprises a cylinder 46 mounted in fixed position adjacent bed 40. Piston 47 which is reciprocated in the cylinder 46 is formed with a plurality of longitudinally spaced teeth 48 which are engaged by a pinion 49 on a shaft 50. A gear 51 is fixed to the shaft 50 and meshes with a small gear 52 rotatably mounted on the screw shaft 27. The gear 52 drives the screw shaft 27 through a one-way clutch 53. A second one-way clutch 54 is provided to prevent retrograde or reverse rotation of the screw shaft 27 during the return the piston 47 to its initial position.

The movement of the piston 47 in a direction to rotate the screw shaft 27 is limited by an adjustable stop 55 which is threaded into the end of the cylinder 46. By rotating the stop 55, it is possible to positively limit the degree of movement of the piston 47 and thereby control the amount of rotation of the screw shaft 27, and, in turn, the distance that the carriage 26 is indexed on each movement of the piston 47. On the return to its initial position, the piston 47 contacts a fixed stop 56.

As further shown in FIG. 13, hydraulic fluid is supplied to the system from a reservoir 57 by a pump 58. The hydraulic fluid flows from the pump 58 through a line 60 to a four-way valve 61 which is controlled by a solenoid 62. In the initial position of the valve 61, the fluid is applied through line 63, flow control 64 and line 65 to the front end of the piston 47 holding the piston in its rear position against the stop 56. At the same time, the line 66 extends to the reservoir 57 through a second flow control 67, line 68, valve 61 and return line 69.

When the solenoid 62 is energized, the valve 61 is reversed causing fluid from the inlet line 60 to flow through line 68, flow control 67 and line 66 to the rear of the piston 47 moving the piston forwardly. The rate at which the piston moves forwardly is controlled by flow control 64 which limits the rate at which the fluid may be exhausted from the forward end of the cylinder. Flow control 64 includes a housing having a transverse wall 70 therein with an opening 71, the size of which is varied by an adjustable member 72 which is movable into and out of the opening 71. The wall 70 is provided with a second opening 73 which is closed by a spring loaded ball 74. When fluid flows in the opposite direction, that is, when fluid is being supplied to the forward end of the cylinder 46, the ball 74 is moved away from the opening 73 permitting unrestricted flow of fluid to the forward end of the cylinder 46.

The flow control 67 is identical in construction to flow control 64 and is connected so that it limits the rate at which the piston 47 moves rearwardly when fluid is supplied to the forward end of the cylinder 46 by restricting the rate of exhaust of fluid from the rear end of the cylinder 46.

By this arrangement, it is possible to accurately control the degree of indexing of the carriage 26 and thereby accurately control the thickness of the gaskets G which are cut from the tube T.

The hydraulic fluid from the pump 58 also is supplied to the hydraulic motor 41 through a line 75 to a four-way valve 76 controlled by solenoid 77. When the piston 43 is in its outward position relative to the mandrel, the control valve 76 is in the position shown in the drawing and hydraulic fluid under pressure is being supplied through line 81, control valve 78 and line 79 to the inner end of the cylinder 42 to hold the piston 43 in outward position. When the solenoid 77 is energized, the valve 76 is rotated to supply hydraulic fluid through the line 80 to the outer end of the cylinder 42 to move the piston 43 inwardly and carry the slide 28 radially inwardly. At the same time, the inner end of the piston 43 is connected to the reservoir through line 79, valve 78, line 81, valve 76 and line 75. The rate at which the carriage 28 is moved inwardly is controlled by a flow control 78 which is of identical construction to the flow controls 64, 67 and is so connected that the exhausting of fluid from the inner end of the cylinder 42 is restricted to control the rate at which slide 28 is moved inwardly while the supply of fluid to the inner end of cylinder 42 is unrestricted.

Figure 14:
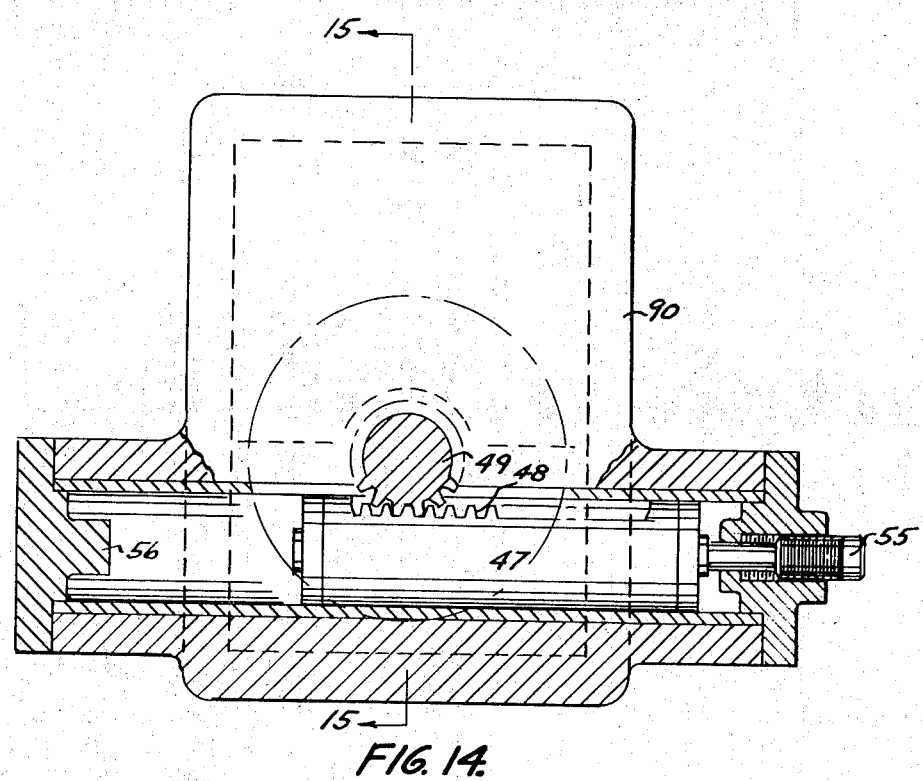
FIG. 14 is a part sectional side elevation of the portion of the indexing mechanism.
Figure 15:
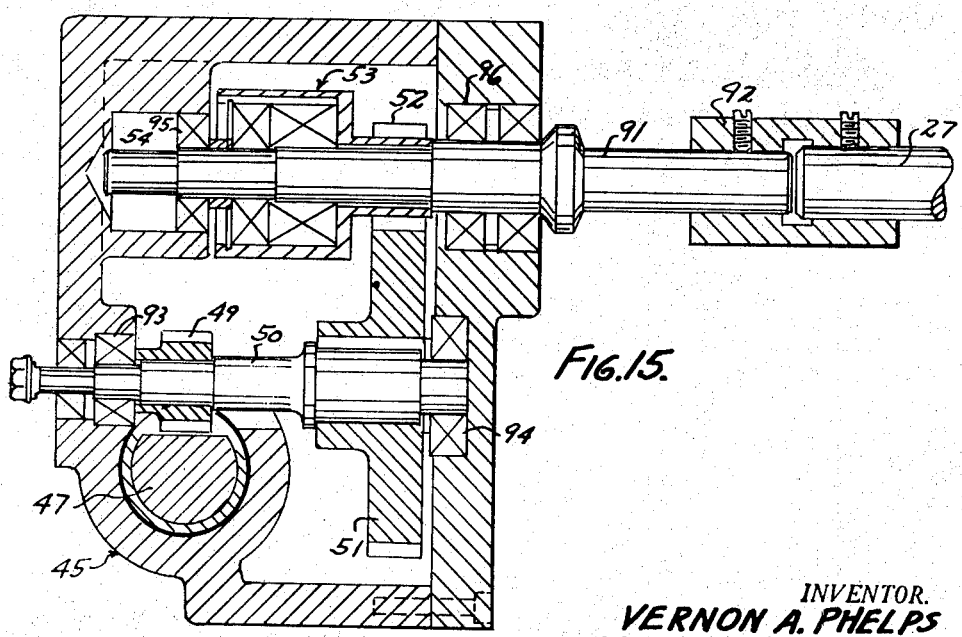
FIG. 15 is a sectional view taken along the line 15—15 in FIG. 14.
Figure 16:
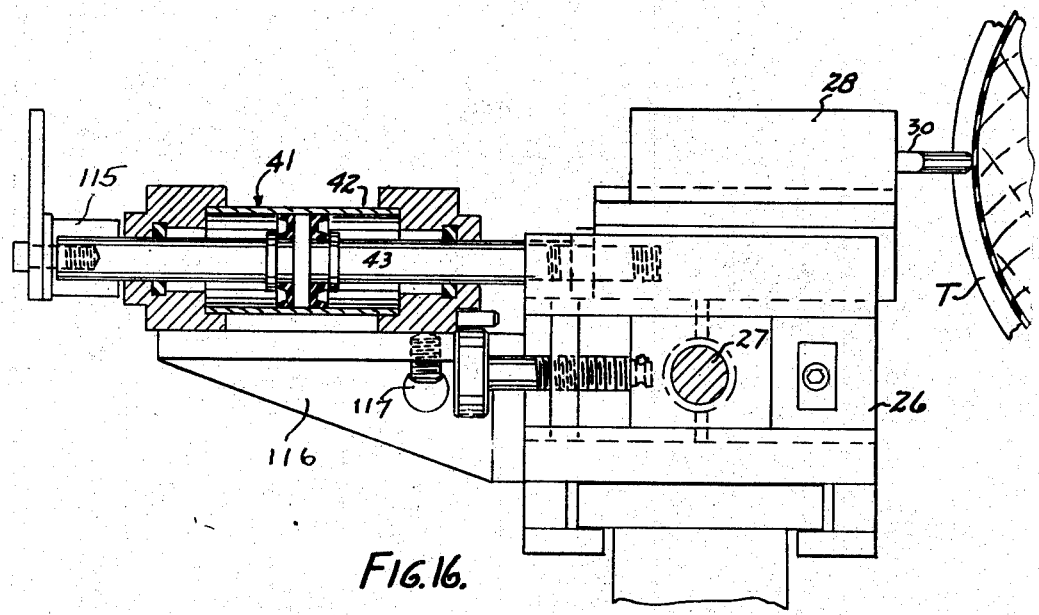
FIG. 16 is a part sectional view of the cutting tool feeding mechanism.

In practice, the piston motor 45, shaft 50, gears 49, 51, 52 and clutches 53, 54 are contained in a unitary housing such as shown in FIGS. 14 and 15. Housing 90 encloses these parts and the output shaft driven by the clutch 53 is in turn connected to the screw shaft 27 by a coupling 92. Shaft 50 is rotatably mounted in the housing by bearings 93, 94 while the shaft 91 is rotatably mounted by bearings 95, 96.

The inward movement of the slide 28 relative to the mandrel is controlled by a spacer 115 which is mounted on the end of the piston rod 43 and limits the inward movement of the piston rod. The spacer 115 may be replaced by a sleeve having a shorter or longer length to change the inward movement of the slide and in turn the tool 30. The inward movement may also be adjusted by changing the position of the cylinder 41 on the bracket 116. The position of the cylinder on the bracket is controlled by a thumb screw 117.

Figure 17:
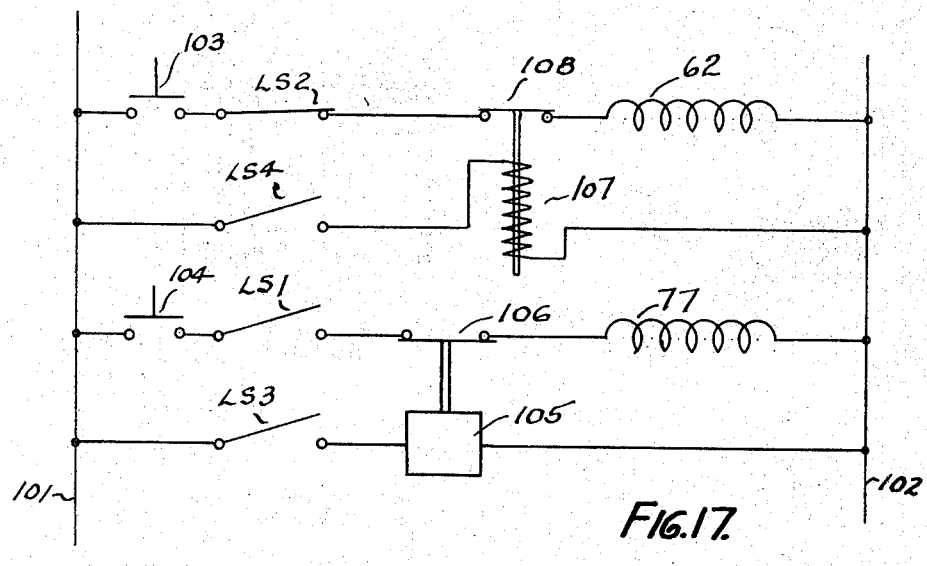
FIG. 17 is a diagrammatic wiring diagram used in the apparatus shown in FIG. 13.

FIG. 17 diagrammatically represents the wiring diagram utilized in controlling the valves 61 and 76 shown in FIG. 13. As shown in FIG. 17, power is provided through lines 101, 102 to a plurality of parallel circuits which include the solenoids 62, 77 which operate the valves 61, 76, respectively. Limit switches LS1 and LS2 are provided in a position to be engaged by the inward and outward movement of the piston 47, limit switch LS1 being normally open and being closed when the piston is moved inwardly and LS2 being normally closed and being opened by movement of the piston outwardly to index carriage 28. Limit switches LS3 and LS4 are mounted in position to be actuated by the slide 28, the limit switch LS3 being normally open and being closed by the movement of the slide 28 inwardly and limit switch LS4 being normally opened and being closed by movement of the slide 28 outwardly.

Limit switch LS2 is in series with solenoid 62. In addition, a switch 108 is provided in series with solenoid 62 and is actuated by a relay 107 in series with limit switch LS4 and is adapted to open the siwtch 108 when the limit switch LS4 is closed.

Limit switch LS3 is in series with solenoid 77. A switch 106 is also provided in series with solenoid 77 and is actuated by a time delay energized by the closing of limit switch LS1.

A start switch 103, 104 is provided in series with the respective circuits of limit switches LS2 and LS3.

At the beginning of the cycle, start switches 103, 104 are closed. Closing of the start switch 103 energizes the solenoid 62 moving the valve 61 into a position to cause the piston 47 to move outwardly and index the carriage 28. As the piston 47 moves to its outward position, limit switch LS2 is opened de-energizing the solenoid 62 and moving the valve 61 to cause the piston 47 to return to its original position. As the piston 47 returns to its original position, limit switch LS1 is closed energizing solenoid 77 and actuating valve 76 to cause the slide 28 to move inwardly. As the slide 28 moves inwardly, limit switch LS3 is closed actuating the time delay 105 and after a predetermined period of time the time delay opens switch 106 to de-energize the solenoid 77, moving the valve 76 into a position so that fluid flows to return the piston 43 operating the slide 26 to its original position. As the slide 26 reaches its outward position, limit switch LS4 is closed energizing relay 107 and closing switch 108 to energize solenoid 62 and begin another cycle.

In this manner, the machine continues to operate successively indexing and moving the cutting tool inwardly and outwardly to sever the gaskets from the tube.

Figure 18:
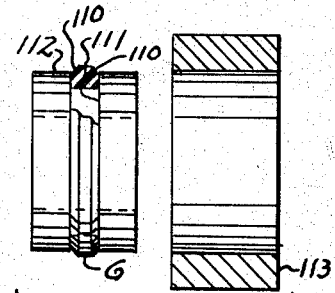
FIG. 18 is a part sectional view showing an application of the gasket made in accordance with the invention.

The gasket which is formed by a simultaneous chamfering and cutting of the tube has a cross section such as shown in FIG. 12 including chamfered or beveled surfaces 110. As shown in FIG. 18, when such a gasket is placed in a groove 111 in a part 112 which is adapted to be inserted in a bushing 113, the beveled edges 110 prevent any cutting or tearing of the gasket during the insertion. In a similar manner, the chamfering or beveling permits the gasket to be used in a dynamic application wherein the part 112 moves relative to the part 113. The use of the chamfered gasket eliminates the need for using expensive O-rings which are inherently undesirable not only because of the cost but in addition because of the spiraling or twisting which occurs when they are used in dynamic applications. In addition, the surface contact of the chamfered gasket is greater than that obtained by an O-ring and therefore a better pressure seal is obtained. By varying the degree of chamfer or bevel, it is possible to control the "break-away" force required to move the one member relative to the other. By chamfering to a greater degree, less surface contact is provided between the gasket and the sliding surface and therefore the breakaway force is less.

The gaskets which are formed in accordance with the invention may be produced with an accuracy of 0.003 inch and even greater accuracy with only spot inspection required.

It can thus be seen that there has been provided a method and apparatus for forming gaskets from soft rubber having a hardness of 80 durometer or less on the A scale with an accuracy which has not been heretofore achieved, both in peripheral dimension and in width.

The use of a novel forming tool made from a material having the properties of high resistance to abrasion, low coefficient of friction and a good conductor of heat, such as preferably diamond forming tools, and the cutting tool made and operated radially under fluid pressure insures proper forming and cutting without the waste of labor or excessive wear on the tools and without the use of lubricants.

The gaskets which are formed by the use of chamfering can be used in applications wherein one member must be moved relative to another either during assembly or in operation.

We claim:

1. The method of making square cut gaskets having close tolerances from a tube of soft rubber having a hardness of less than 80 durometer on the A scale which comprises mounting said tube over a mandrel, rotating said tube about its axis, moving a diamond cutting tool into contact with the periphery of said tube and thereafter causing relative motion between said tube and said tool in a direction axially of said tube, to thereby accurately dimension the surface of said tube, and thereafter severing said tube into a plurality of gaskets by rotating said tube about its axis and successively moving a cutting tool radially inwardly of said tube while it is supported over a mandrel in a straight line by the use of controlled hydraulic pressure while the tube is being rotated to successively sever said tube.

2. The method set forth in claim 1 including the step of providing a circumferential groove in the periphery of said tube at successive longitudinally spaced points prior to cutting said gaskets and after said tube has had the surface thereof accurately formed.

3. The method of making square cut gaskets having close tolerances from a tube of soft rubber having a hardness of less than 80 durometer on the A scale which comprises mounting said tube over a mandrel, rotating said tube about its axis, moving a diamond cutting tool into contact with the periphery of said tube and thereafter causing relative motion between said tube and said tool in a direction axially of said tube, to thereby accurately dimension the surface of said tube, said tip having a side rake angle ranging from 4 to 15 degrees, a back rake angle of 4 to 15 degrees, a front relief angle of 6 to 15 degrees and a cutting angle of 85 degrees, and thereafter severing said tube into a plurality of gaskets by rotating said tube about its axis and successively moving a cutting tool radially inwardly of said tube in a straight line by the use of controlled hydraulic pressure while the tube is being rotated to successively sever said tube.

4. In the method of making gasgets having close tolerances from a tube of soft rubber having a hardness of less than 80 durometer on the A scale the steps which comprise mounting said tube over a mandrel, rotating the mandrel about its axis at a peripheral speed of at least 1000 feet per minute, moving a diamond cutting tool into contact with the periphery of said tube and causing relative movement between said tube and said tool in a direction parallel to the axis of said mandrel while said mandrel is rotating, said tip having a side rake angle ranging from 4 to 15 degrees, a back rake angle of 4 to 15 degrees, a front relief angle of 6 to 15 degrees and a cutting angle of 85 degrees.

5. The method of making square cut gaskets having close tolerances from a tube of soft rubber having a hardness of less than 80 durometer on the A scale which comprises mounting said tube over a mandrel, rotating said tube about its axis, moving a cutting tool made of a material which has a high resistance to abrasion, a low coefficient of friction and is a good conductor of heat into contact with the periphery of said tube and thereafter causing relative motion between said tube and said tool in a direction axially of said tube, to thereby accurately dimension the surface of said tube, and thereafter severing said tube into plurality of gaskets by rotating said tube about its axis and successively moving a cutting tool radially inwardly of said tube in a straight line by the use of controlled hydraulic pressure while the tube is being rotated to successively sever said tube.

6. The method of making square cut gaskets having close tolerances from a tube of soft rubber having a hardness of less than 80 durometer on the A scale which comprises mounting said tube over a mandrel, rotating said tube about its axis, moving a cutting tool made of a material which has a high resistance to abrasion, a low coefficient of friction and is a good conductor of heat into contact with the periphery of said tube and thereafter causing relative motion between said tube and said tool in a direction axially of said tube, to thereby accurately dimension the surface of said tube, said tip having a side rake angle ranging from 4 to 15 degrees, a back rake angle of 4 to 15 degrees, a front relief angle of 6 to 15 degrees and a cutting angle of 85 degrees, and thereafter severing said tube into a plurality of gaskets by rotating said tube about its axis and successively moving a cutting tool radially inwardly of said tube in a straight line by the use of controlled hydraulic pressure while the tube is being rotated to successively sever said tube.

7. In the method of making square cut gaskets having close tolerances from a tube of soft rubber having a hardness of less than 80 durometer on the A scale the steps which comprise mounting said tube over a mandrel, rotating the mandrel about its axis, moving a cutting tool made of a material which has a high resistance to abrasion, a low co-efficient of friction and is a good conductor of heat into contact with the periphery of said tube and causing relative movement between said tube and said tool in a direction parallel to the axis of said mandrel while said mandrel is rotating, said tip having a side rake angle ranging from 4 to 15 degrees, a back rake angle of 4 to 15 degrees, a front relief angle of 6 to 15 degrees and a cutting angle of 85 degrees.

References Cited

UNITED STATES PATENTS

| | | | |
|---|---|---|---|
| 221,552 | 11/1879 | Hanson | 29—97 |
| 324,409 | 8/1885 | Nutting | 82—2.5X |
| 488,361 | 12/1892 | Lawson | 29—97 |
| 1,049,255 | 12/1912 | Merritt | 82—47 |
| 1,346,056 | 7/1920 | Poulain | 29—96 |
| 2,016,590 | 10/1935 | Bussing | 82—1X |
| 2,476,530 | 7/1949 | Belada | 82—100 |
| 3,101,019 | 8/1963 | Lelan | 82—2 |
| 181,154 | 8/1876 | Dyer | 82—1 |
| 1,821,743 | 9/1931 | Dreyhaupt | 82—1 |
| 929,679 | 8/1909 | Lorenz | 82—47 |
| 3,118,333 | 1/1964 | Pilcher II, et al. | 82—47 |
| 1,723,221 | 8/1929 | Vandervoort et al. | 82—4 |
| 1,986,587 | 1/1935 | Ludington | 82—47 |
| 1,086,606 | 2/1914 | Merritt et al. | 82—48 |

GERALD A. DOST, Primary Examiner

U.S. Cl. X.R.

82—1, 11, 48, 52, 101